(12) United States Patent
Zhang et al.

(10) Patent No.: US 7,497,739 B2
(45) Date of Patent: Mar. 3, 2009

(54) ELECTRICAL CONNECTOR ASSEMBLY

(75) Inventors: George (Huan Yi) Zhang, Irvine, CA (US); Tsu-Yang Wu, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/810,814

(22) Filed: Jun. 7, 2007

(65) Prior Publication Data

US 2008/0305687 A1    Dec. 11, 2008

(51) Int. Cl.
  H01R 25/00   (2006.01)
  H01R 27/02   (2006.01)
  H01R 31/00   (2006.01)
  H01R 33/92   (2006.01)
  H01R 33/94   (2006.01)
  H01R 33/88   (2006.01)
  H01R 33/90   (2006.01)

(52) U.S. Cl. .......................... 439/638; 439/79

(58) Field of Classification Search ............... 439/79, 439/80, 638, 76.1
See application file for complete search history.

(56) References Cited

U.S. PATENT DOCUMENTS 6,071,150 A    6/2000   Tang et al.
6,364,713 B1 *  4/2002   Kuo ........................... 439/638

* cited by examiner

Primary Examiner—Javaid Nasri
(74) Attorney, Agent, or Firm—Wei Te Chung (57) ABSTRACT

An electrical connector assembly includes a connector body having a first mating face (21), an opposite second mating face (31), and a mounting face (25 or 35) disposed adjacent a printed circuit board (1), which is capable of providing different predetermined voltages. A first group of contact terminals (4) extends from the first mating face towards the second mating face. A second group of contact terminals (5) extends from the first mating face towards the mounting face. A third group of contact terminals (6) extends from the second mating face towards the mounting face. Thus, the electrical connector assembly provides a flexible connection to any commodity devices of requiring different predetermined voltages.

7 Claims, 8 Drawing Sheets

ELECTRICAL CONNECTOR ASSEMBLY

BACKGROUND OF THE INVENTION

1. Field of the Invention

The present invention relates to an electrical connection device, and particularly to an electrical connector assembly having two opposite connection interfaces adapted to respectively be coupled to a female connector of a backplane and a male connector of a hard drive.

2. Description of the Related Art

U.S. Pat. No. 6,071,150 issued on Jun. 6, 2000, discloses an electrical connector assembly including a male section and a female section assembled together to be coupled between a female connector on a backplane in the computer and a male connector on a hard drive for establishing signal transmission between the hard drive and the backplane through the interconnections of such male and female sections. Specifically, the female section defines a female interface adapted for mating with the male connector from the hard drive, the male section defines an opposite male interface adapted to mate with the female connector from the backplane of the computer, and a plurality of contact terminals are configured to extend from the female interface towards the male interface for electrically connecting the female section with the male section. This configuration typically enables the female or male interface to supply one voltage for the male connector of the hard drive, or the female connector of the backplane.

The present problem the users confront, is that the female or male interface substantially requires an electronic device of a first predetermined voltage to be equipped therewith, while the electronic component available for the users has a second predetermined voltage. In other words, the conventional configuration has no capability to provide a flexible connection to different types of electronic devices, which may require voltages of different amounts.

SUMMARY OF THE INVENTION

A major object of an embodiment of the present invention is to provide an electrical connector assembly for a flexible connection to electronic devices of requiring different predetermined voltages.

An electrical connector assembly according to an embodiment of the present invention includes a first connector having a mating face and a mounting face, and a second connector having a mating surface and a mounting surface. The mounting face and the mounting surface are disposed adjacent a printed circuit board, which is capable of providing different predetermined voltages. A first group of contact terminals is adapted to extend from the mating face of the first connector toward the mating surface of the second connector. A second group of contact terminals is adapted to extend from the mating face towards the mounting face of the first connector. A third group of contact terminals is adapted to extend from the mating surface towards the mounting surface of the second connector. Due to the printed circuit board of providing two predetermined voltage for the first connector and/or the second connector, the mating face or the mating surface is capable of being coupled to the electronic devices of requiring different predetermined voltages. Thus, the electrical connector assembly provides a flexible connection to any commodity devices of different predetermined voltages.

Other features and advantages of the present invention will become more apparent to those skilled in the art upon examination of the following drawings and detailed description of preferred embodiments, in which:

DETAILED DESCRIPTION OF PREFERRED EMBODIMENTS

Referring to FIGS. 1 to 4, an interconnection system according to an embodiment of the present invention is shown to include a printed circuit board 1, and an electrical connector assembly including a female section 2 and a male section 3 assembled together to be electrical connection to the printed circuit board 1. In this embodiment, the printed circuit board 1 may be formed with an internal circuitry, which supplies two predetermined voltages for the female section 2 and/or the male section 3, thereby achieving a flexible connection for the interconnection system to any commodity HDD (Hard Disk Drive), which is coupled to the female section 2, or to any existing backplane of a computer, which is coupled to the male section 3.

Figure 1:
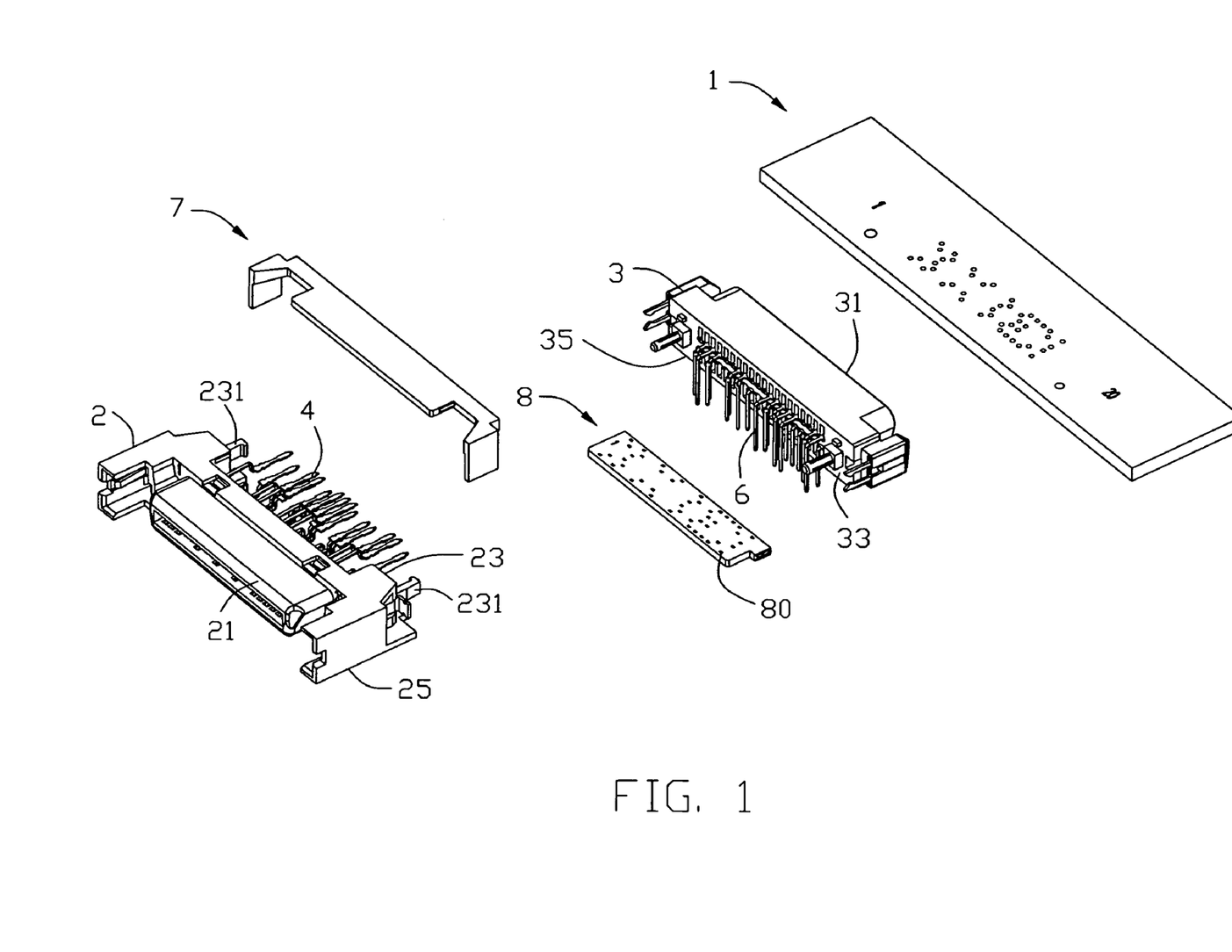
FIG. 1 is an exploded, perspective view of an interconnection system according to an embodiment of the present invention.
Figure 2:
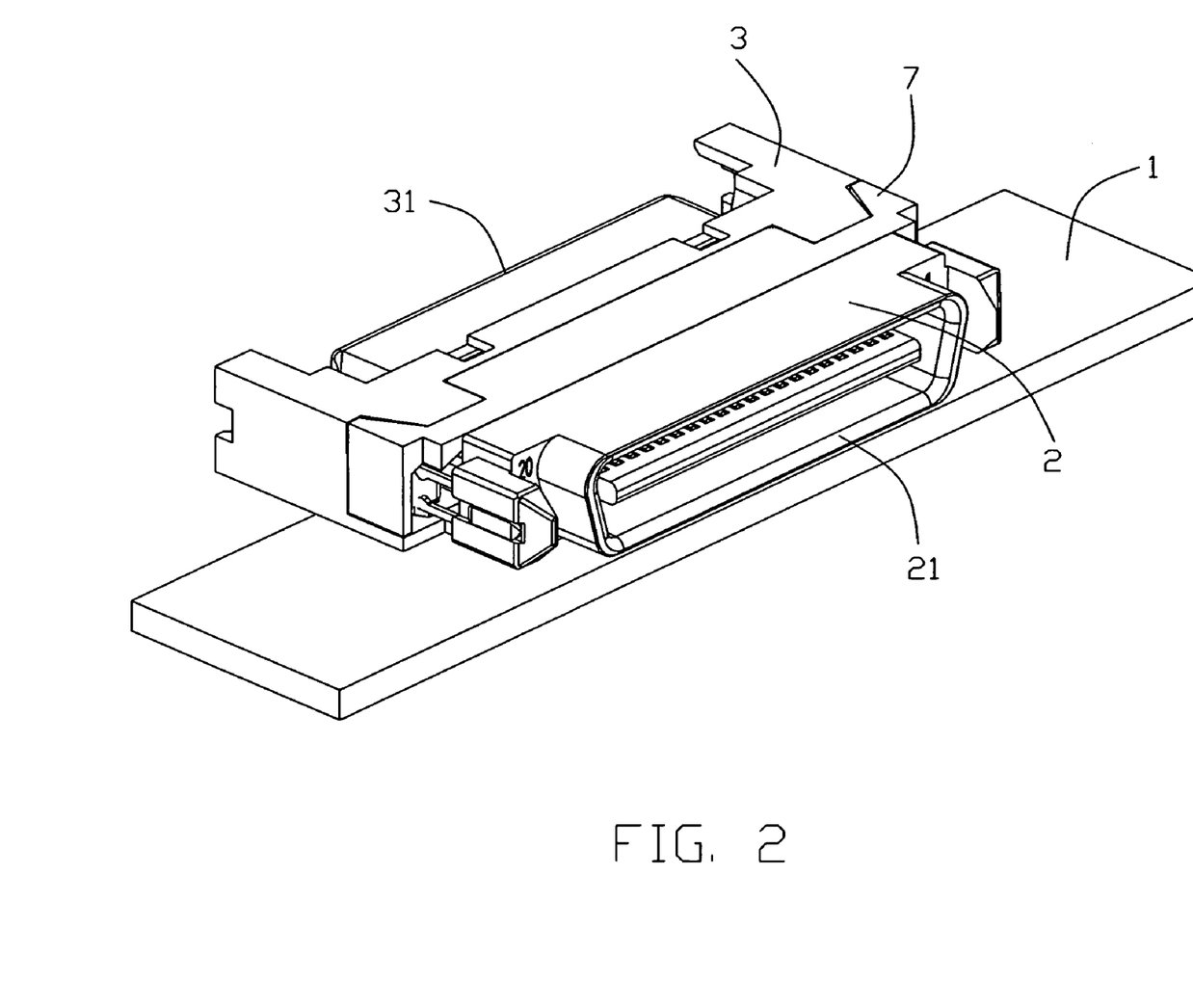
FIG. 2 is an assembled, perspective view of the interconnection system of FIG. 1.
Figure 3:
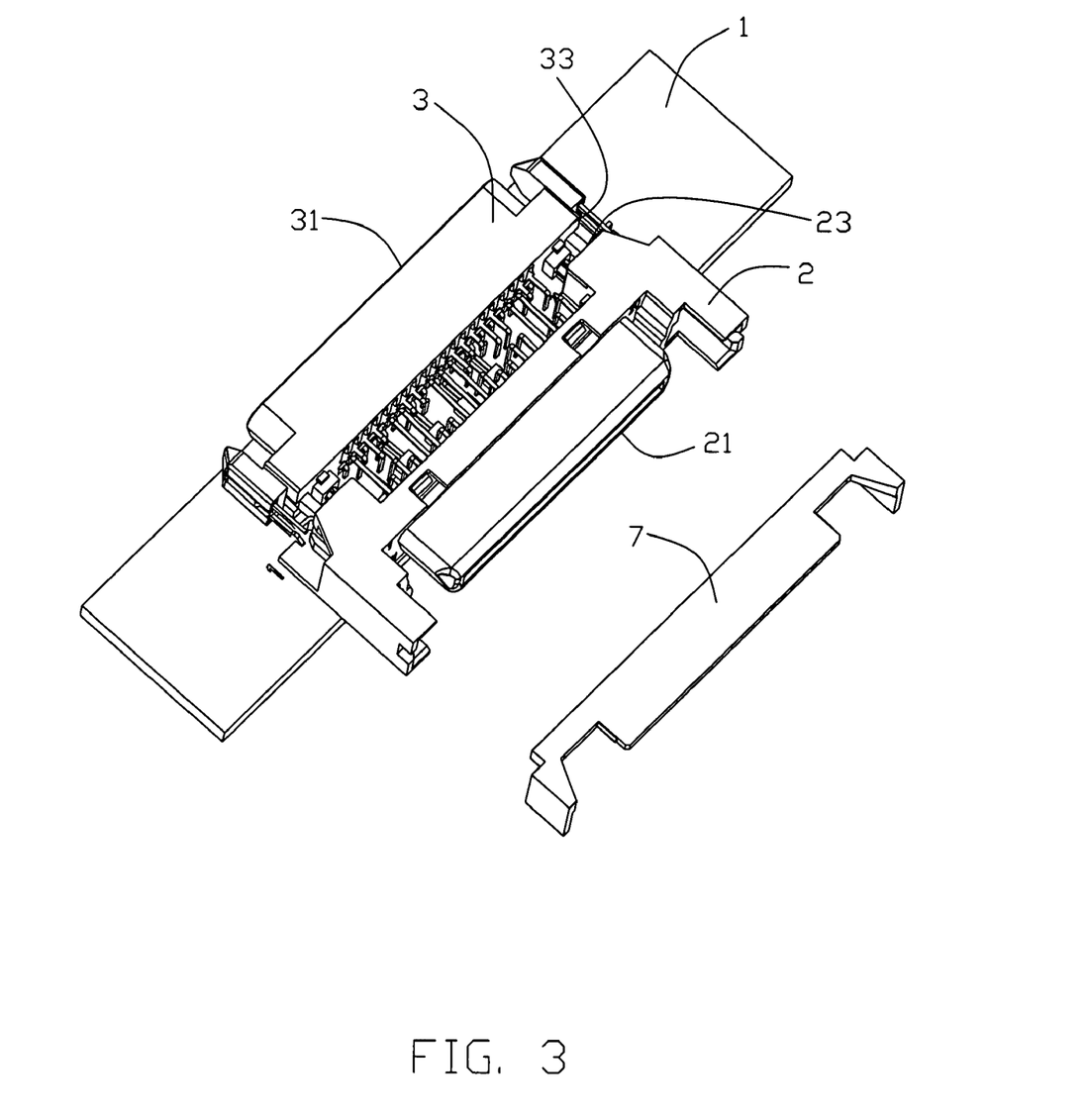
FIG. 3 is another perspective view of the interconnection system of FIG. 2, but with a middle cover disengaged therefrom.
Figure 5:
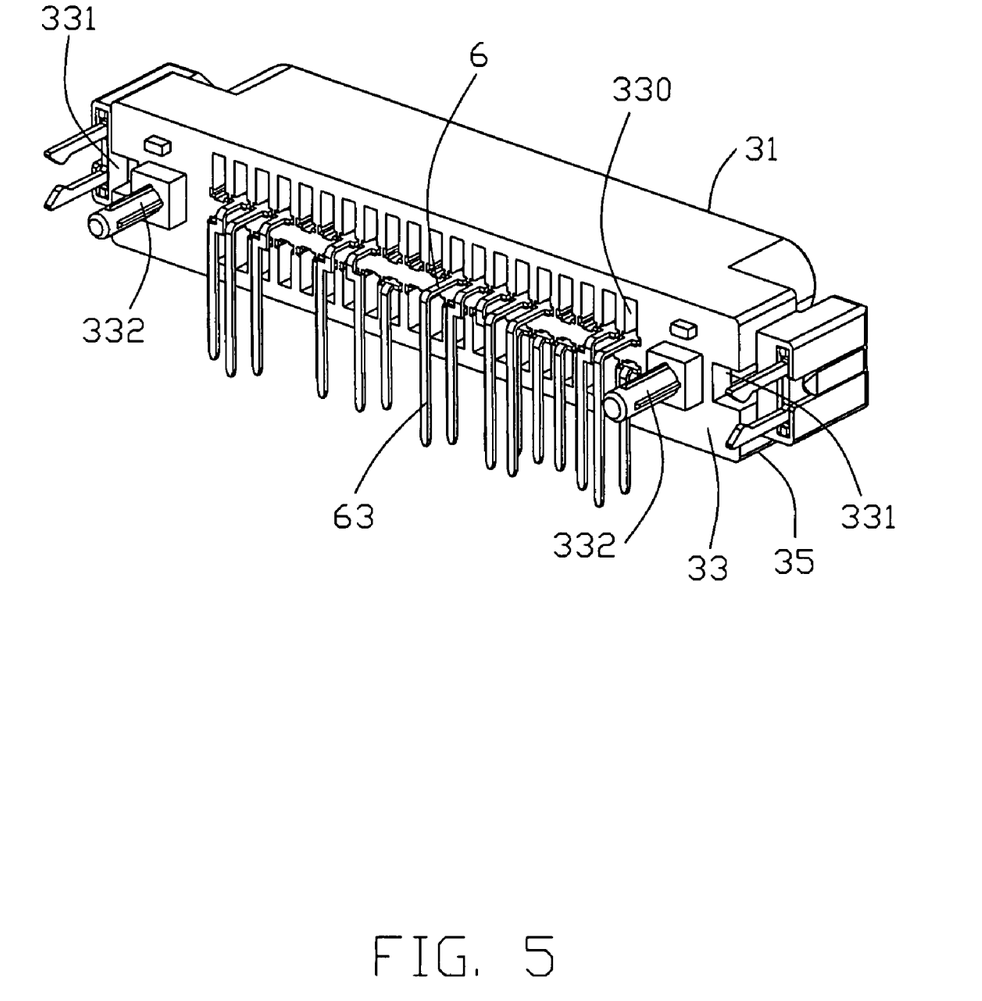
FIG. 5 is a perspective view of a first connector of the electrical connector assembly of FIG. 2.
Figure 6:
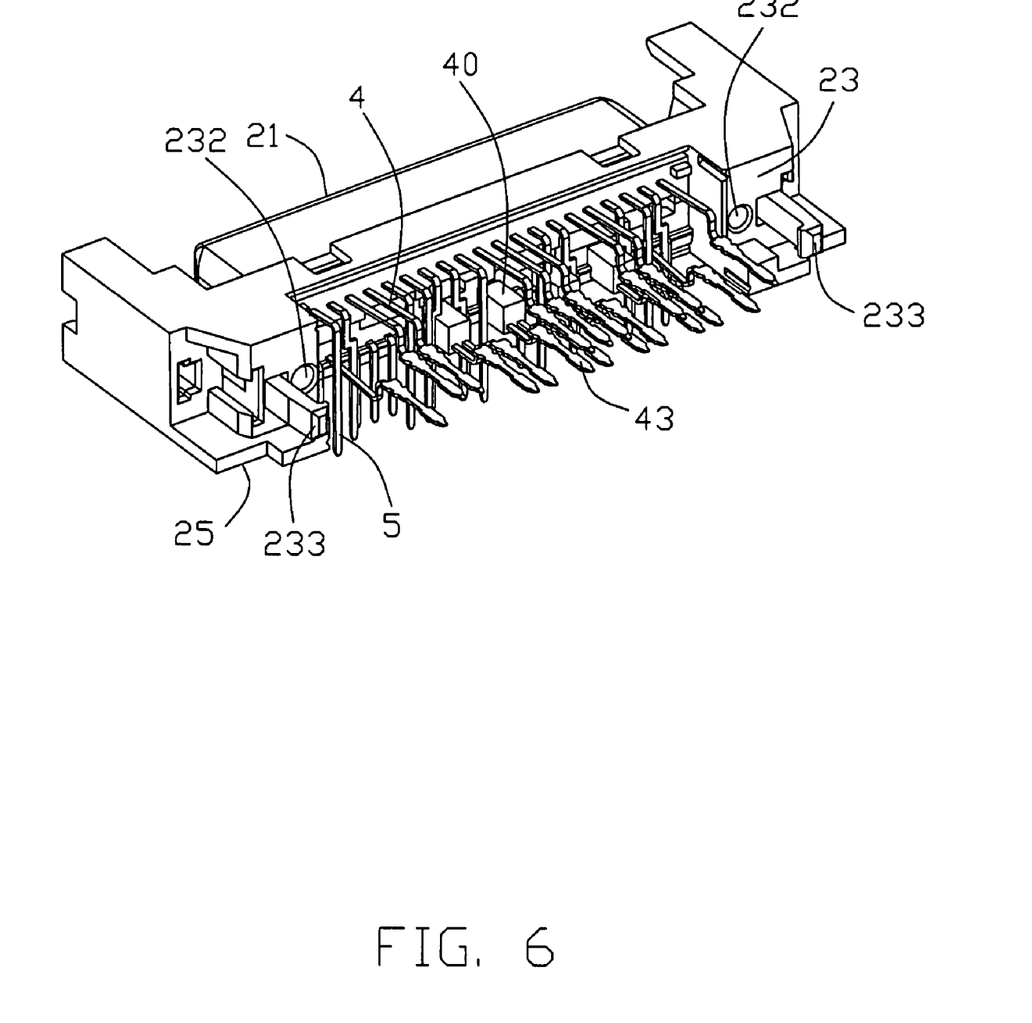
FIG. 6 is a perspective view of a second connector of the electrical connector assembly of FIG. 2.

Referring particularly to FIGS. 1 and 5-6, the female section 2 includes a base having a female mating face 21 adapted to mate with a male connector (not shown) mounted adjacent a front edge of the HDD, a first abutment face 23 opposite to the female mating face 21, and a female mounting face 25 disposed adjacent the printed circuit board to extend between the female mating face 21 and the first abutment face 23. The male section 3 also includes a body having a male mating face 31 opposite to the female mating face 21 and adapted to mate with a female connector (not shown) mounted on a backplane of a computer system, a second abutment face 33 opposite to the first abutment face, and a male mounting face 35. In this embodiment, the female mounting face 25 and the male mounting face 35 are disposed in a common plane.

Figure 7:
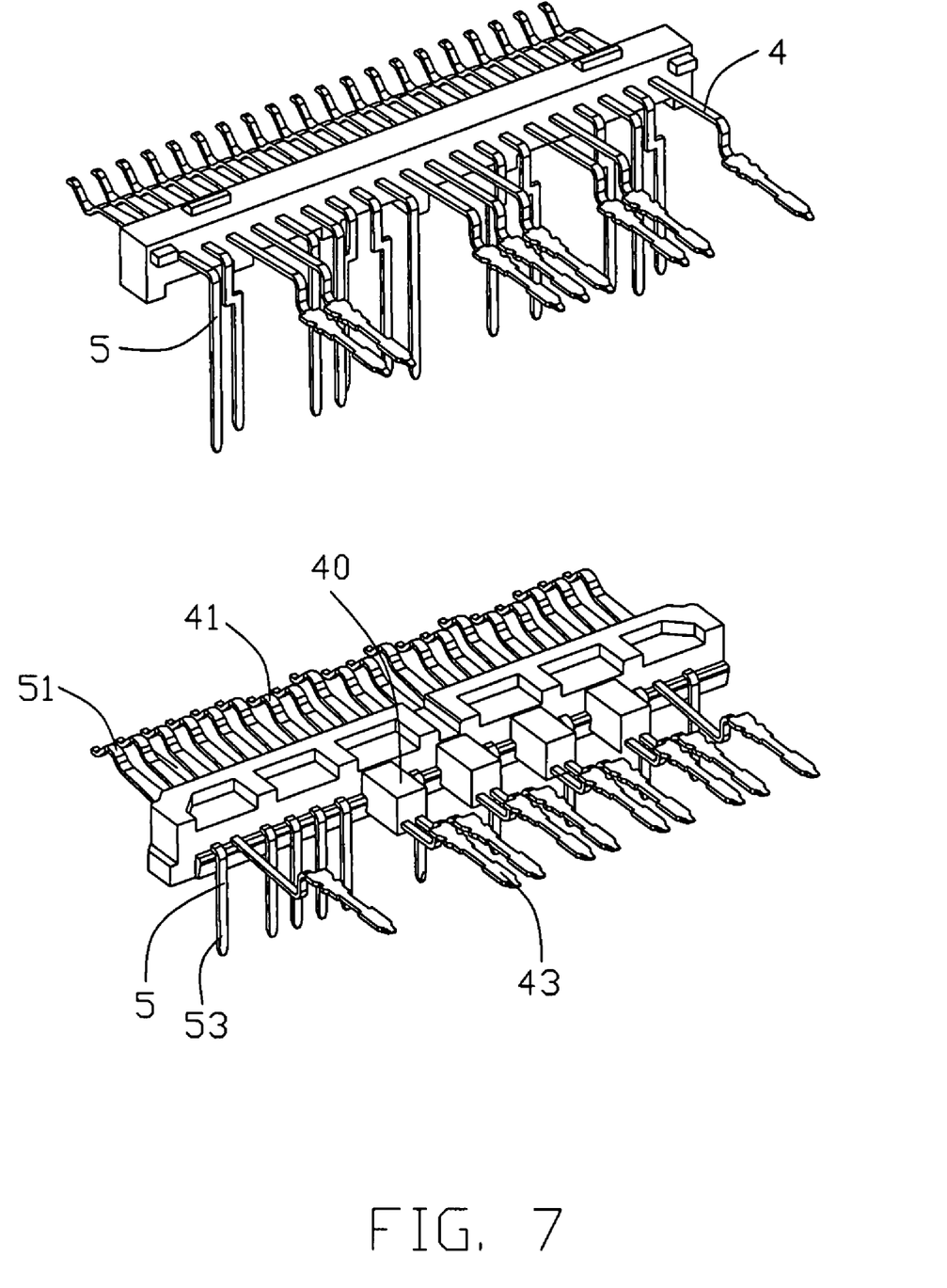
FIG. 7 is an exploded, perspective view of a contact terminal holding member of the second connector of FIG. 6.
Figure 8:
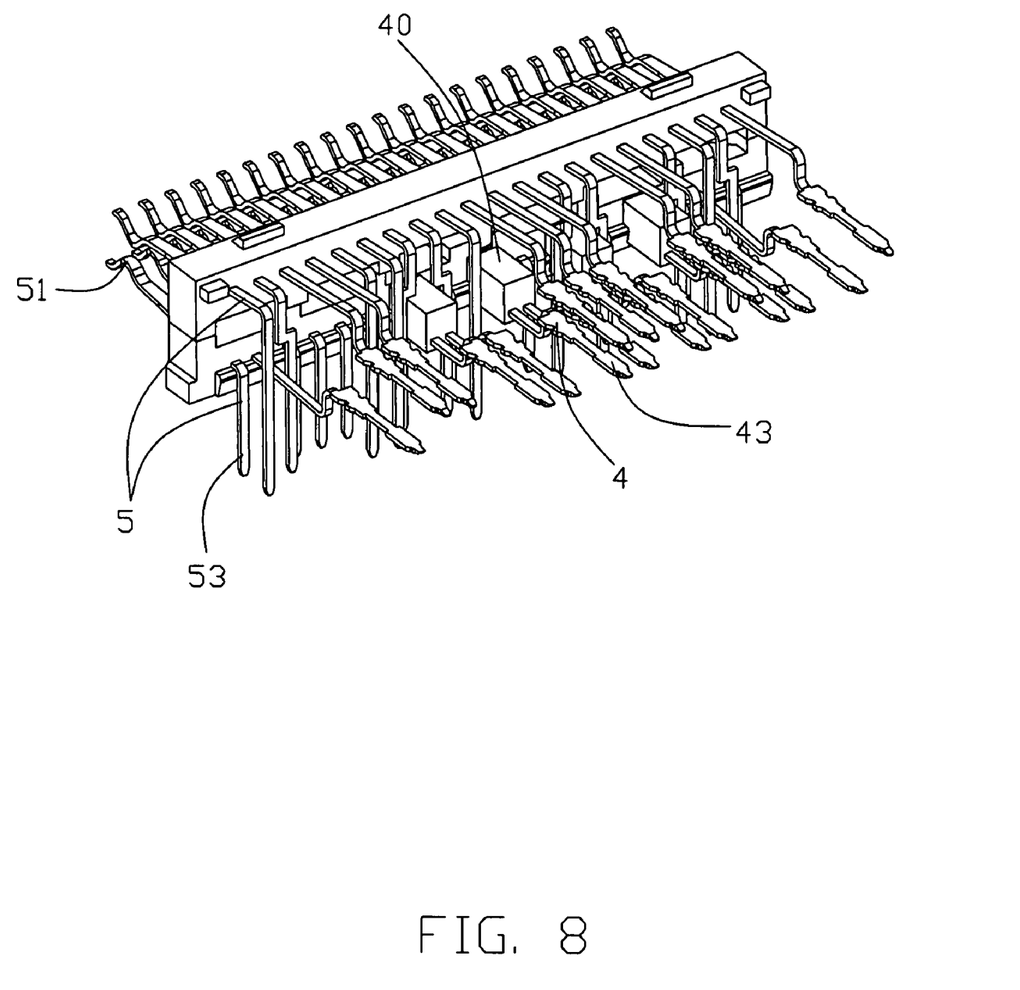
FIG. 8 is an assembled, perspective view of the contact terminal holding member of FIG. 7.

A first group of contact terminals 4 extends in a direction from the female mating face 21 towards the male mating face 23 so as to electrically connect the female section 2 with the male section 3. The first group of contact terminals 4 is of signal terminals for transmitting signal between the female section 2 and the male section 3. As shown in FIG. 7, a selected number of signal terminals 4 has respective insulative segments 40 molded over portions of signal terminals 4 adjacent the first abutment face 23 of the female section 2 for controlling the impedances of the selected signal terminals 4 so as to enable the signal terminals 4 to be transmitted at a more high speed data rate. The first group of contact terminals 4 includes female contact ends 41 adjacent the female mating face 21 for engaging with respective contacts of the male connector of the HDD, and male contact ends 43 extending in the lengthwise direction and adjacent the male mating face 31, i.e., in the direction from the female mating face 21 towards the male mating face 31 for engaging respective terminals of the female connector of the backplane.

A second group of contact terminals 5 extends from the female mating face 21 towards the female mounting face 25 for being connected to the printed circuit board 1 disposed under the female section 2. Each contact terminal 5 within the second group is of a right angle configuration, with a first contact section 51 adjacent the female mating face 21 to be laterally or longitudinally aligned with the female contact end 41 of the contact terminal 4 of the first group, and a second free tailing section 53 extending parallel to the first abutment face 23 to be electrical connection to the printed circuit board 1. In this embodiment, the second group of contact terminals 5 may include power contact terminals and ground contact terminals, positions of which are determined by specifications of connectors. It should be noted that the orientation of the second group of contact terminals 5 with respect to the female mating face 21 or the first abutment face 23, is different from that of the first group of contact terminals 4.

A third group of contact terminals 6 extends from the male mating face 31 towards the male mounting face 35 for being electrical connection to the printed circuit board 1. Each contact terminal 6 within the third group is also of a right angle configuration, with a first contact portion adjacent the male mating face 31 to be laterally or longitudinally aligned with the male contact end 43 of the contact terminal 4 of the first group for engaging the respective terminals of the female connector of the backplane, and a second free tailing portion 63 extending parallel to the second abutment face 33 to be electrical connection to the printed circuit board 1. In this embodiment, the third group of contact terminals 6 may include power contact terminals and ground contact terminals, positions of which are determined by specifications of connectors. The second abutment face 33 of the male section 3 defines a plurality of male passageways 330, some of which receives the contact terminals 6 of the third group, others of which receives the contact terminals 4 from the first group of the female section 2.

It should be noted that, in an alternative embodiment, the first group of contact terminals 4 may include a single contact terminal, the second group of contact terminals 5 may include a single contact terminal, and the third group of contact terminals 6 may include a single contact terminal. In addition, while the electrical connector assembly having the separable female and male sections 2 and 3 assembled together is preferred, the electrical connector assembly of being a single unit may also be employed.

Figure 4:
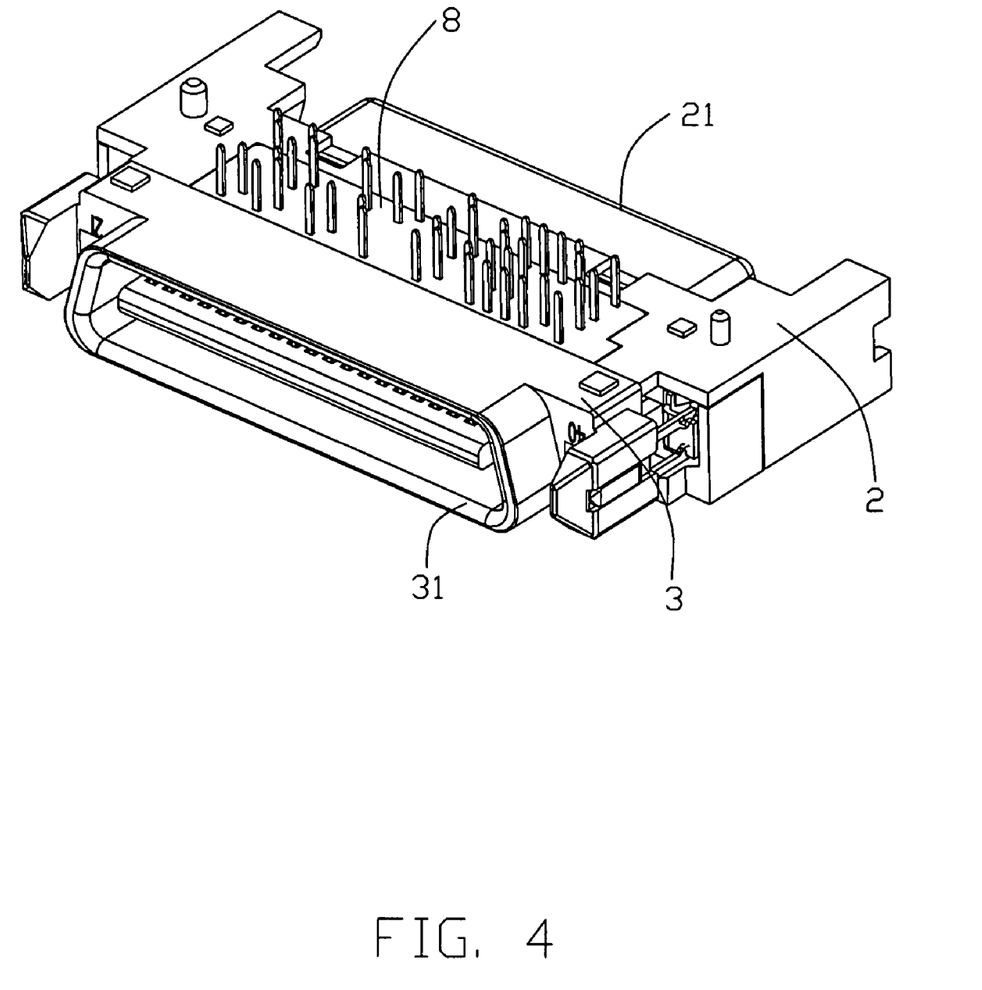
FIG. 4 is another perspective view of an electrical connector assembly of the interconnection system of FIG. 2.

Referring to FIGS. 1 and 5-6, the first abutment face 23 of the female section 2 and the second abutment face 33 of the male section 3 include interengaging elements extending therefrom for fastening the female section 2 to the male section 3. More specifically, the second abutment face 33 of the male section 3 has a pair of indents 331 extending thereinto for latchably receiving inward latches 231 disposed adjacent two ends of the first abutment face 23 of the female section 2, and a pair of alignment posts 332 extending outwardly therefrom for being engagably received within alignment slots 232 of the first abutment face 23, so as to have the male section 3 and the female section 2 assembled together. In addition, the electrical connector assembly further includes a middle cover 7 disposed on a top region between the female section 2 and the male section 3, and a middle spacer 8 on a bottom region between the female section 2 and the male section 3. As shown in FIG. 4, the middle spacer 8 defines a plurality of through holes 80 for the free tailing sections 53 of the contact terminals 5 of the second group and the free tailing portions 63 of the contact terminals 6 of the third group to be penetrated therethrough so as to be electrical connection to the printed circuit board 1.

Manufacturing of the above electrical connector assembly including the female section 2 and the male section 3 may include the following steps: providing the female section 2 having the female mating face 21 and the female mounting face 25; providing the male section 3 having the male mating face 31 and the male mounting face 35; providing the first group of contact terminals 4 adapted to extend from the female mating face 21 towards the male mating face 31; providing the second group of contact terminals 5 adapted to extend from the female mating face 31 towards the female mounting face 35; providing the third group of contact terminals 6 adapted to extend from the male mating face 31 towards the male mounting face 35; electrically connecting the contact terminals 5 and 6 of the second group and the third group to the printed circuit board 1. Due to the printed circuit board 1 of providing two predetermined voltage for the female section 2 and/or the male section 3, the female mating face 21 or the male mating face 31 is capable of being coupled to the electronic devices of requiring different predetermined voltages. Thus, the interconnection system provides a flexible connection to any commodity devices of different predetermined voltages.

While the present invention has been described with reference to preferred embodiments, the description of the invention is illustrative and is not to be construed as limiting the invention. Various of modifications to the present invention can be made to preferred embodiments by those skilled in the art without departing from the true spirit and scope of the invention as defined by the appended claims.

What is claimed is:

1. An electrical connector assembly comprising:
a first connector comprising:
a connector body having a base and a first abutment face; and
a plurality of contacts extending from the base and beyond said first abutment face, the contacts oriented in a first direction away from said first abutment face;
a second connector comprising:
a body and a second abutment face opposite to said first abutment face of the first connector; and
a plurality of terminals extending from the body and beyond said second abutment face, some of the terminals oriented in said first direction away from said second abutment face and the remainder of the terminals oriented in a second direction from said second abutment face towards said first abutment face, wherein said first direction is perpendicular to said second direction;
wherein said terminals of the second connector that are oriented in said second direction extend into said first abutment face of the first connector;
further comprising a middle spacer disposed on a bottom region between the first connector and the second connector and defining a plurality of through holes which respectively receive said contacts of the first connector and said some of the terminals of the second connector therein;
wherein the first connector body and the second connector body are directly fastened together as a unit.

2. The electrical connector assembly of claim 1, wherein the body of the second connector includes an insulative segment disposed adjacent said second abutment face to be molded over at least one of said terminals that are oriented in said second direction.

3. The electrical connector assembly of claim 1, wherein said first direction extends parallel to said first or second abutment face.

4. The electrical connector assembly of claim 1, further comprising a middle cover disposed on a top region between the first connector and the second connector.

5. The electrical connector assembly of claim 1, wherein the first and second connectors includes interengaging elements on said opposite first and second abutment faces for engaging the first connector with the second connector.

6. The electrical connector assembly of claim 5, wherein one of the first and second connectors includes latches, another one of the first and second connectors includes indents for the latches to be latchably received therewithin.

7. An electrical connector assembly comprising:
   a first connector comprising:
   a connector body having a base and a first abutment face; and
   a plurality of contacts extending from the base and beyond said first abutment face, the contacts oriented in a first direction away from said first abutment face;
   a second connector comprising:
   a body and a second abutment face opposite to said first abutment face of the first connector; and
   a plurality of terminals extending from the body and beyond said second abutment face, some of the terminals oriented in said first direction away from said second abutment face and the remainder of the terminals oriented in a second direction from said second abutment face towards said first abutment face, wherein said first direction is perpendicular to said second direction;
   wherein said terminals of the second connector that are oriented in said second direction extend into said first abutment face of the first connector;
   wherein the first and second connectors includes interengaging elements on said opposite first and second abutment faces for engaging the first connector with the second connector;
   wherein one of the first and second connectors includes latches, another one of the first and second connectors includes indents for the latches to be latchably received therewithin.

* * * * *